(No Model.)
J. J. HAYES.
METHOD OF AND APPARATUS FOR TREATING BREWERS' GRAINS.
No. 511,949. Patented Jan. 2, 1894.
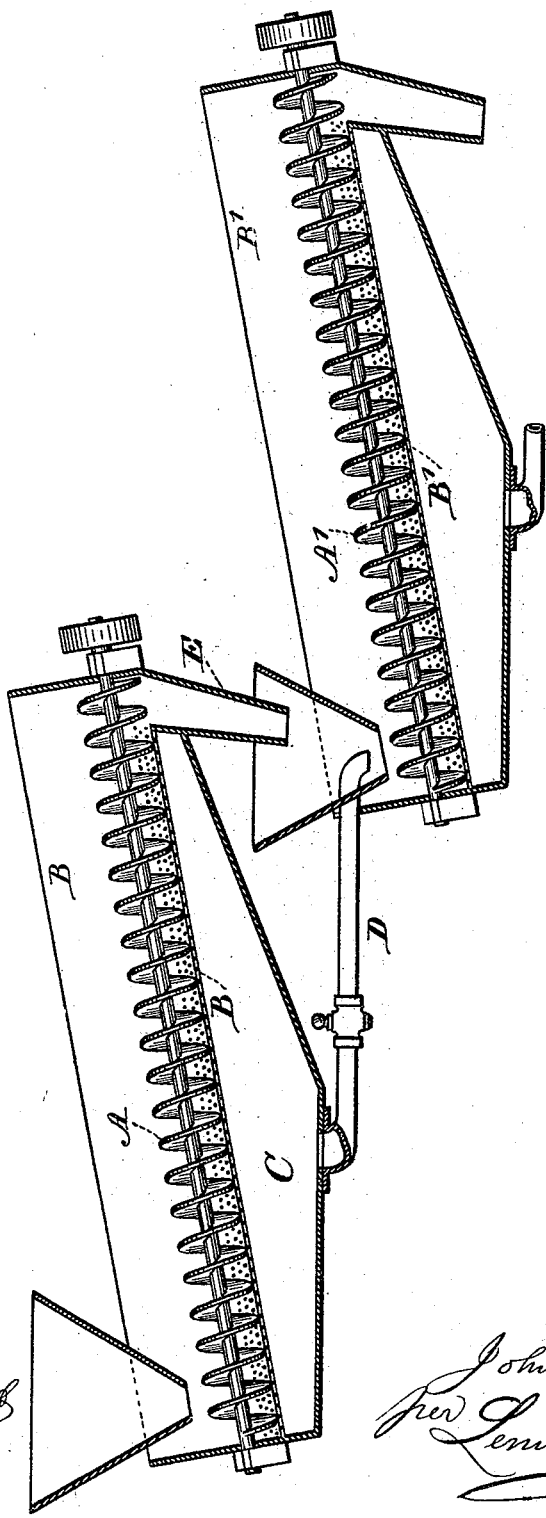

UNITED STATES PATENT OFFICE.

JOHN J. HAYES, OF FLUSHING, NEW YORK.

METHOD OF AND APPARATUS FOR TREATING BREWERS' GRAINS.

SPECIFICATION forming part of Letters Patent No. 511,949, dated January 2, 1894.

Application filed March 9, 1893. Serial No. 465,231. (No model.)

*To all whom it may concern:*

Be it known that I, JOHN J. HAYES, a citizen of the United States, residing at Flushing, in the county of Queens and State of New York, have invented an Improvement in Methods of and Apparatus for Treating Brewers' Grains, of which the following is a specification.

The mash or refuse of breweries and distilleries, sometimes known as swill, is adapted to being fed to cattle, but the quantity of water therein is so great as to render such material difficult to transport and not well adapted to feeding cattle, and efforts have heretofore been made to rid this material of the water and to render the same sufficiently dry either for the use of cattle or for transportation from one place to another. If the water is allowed to run away, there is considerable starch and nutritious material that is taken off with the same and hence the value of the grains is materially lessened, and in addition to this, such watery portions speedily putrefy and become offensive, and when efforts have been made to drive off the water by evaporation great expense is incurred for the fuel. I have discovered that the refuse grains from which the watery particles have been separated, are well adapted to use as a filter for retaining the solid materials that have passed off with the water.

My present invention therefore relates to the method of and apparatus for depriving brewers' grains of water and saving the useful materials. The grains in their wet condition are moved along progressively and a portion of the water thereby expelled, and the principal portion of the solid materials contained in such water is retained by the partially dried material by causing such water to run through the partially dried material by gravity, and the operation is made substantially continuous by causing the liquid that has been expelled in the first part of the apparatus to run through the partially dehydrated material in the second part of the apparatus, and the operations are continued successively to whatever extent is desired until the water that passes by gravity out of the material is substantially free from solid matter, and the solid matter is sufficiently free from water to be easily dried for transportation.

In the drawing I have represented by a vercal section an apparatus in which my method may be put into operation.

In carrying out my invention the mash or brewers' grains in the ordinary condition is subjected to a mechanical action, preferably by a screw conveyer A in a perforated trough B by which the grains are moved along from one end to the other of the trough over the perforations, and the liquid materials run through such perforations in B and the comparatively dry grains are delivered preferably at the higher end of such trough by the chute E. The watery portions passing through the perforated metal or screens in the bottom of the trough are received into a suitable vat or vessel C and may be allowed to remain therein any desired length of time, and the materials from such vat, preferably from the bottom of the vat, are allowed to run by the pipe D or may be pumped or otherwise discharged upon the materials that have been previously partially dried as aforesaid, and such previously partially dried materials act as a filter for retaining the solid materials that accompany the water that is discharged over them, so that such water passes off, leaving the solid materials with the previously partially dried grain. This in its turn is advantageously subjected to a mechanical action such as the pressure against the grain resulting from driving the grain along by a conveyer A' in a second perforated trough B' to force out the liquid materials and discharge the grain in a comparatively dry condition, and these operations may be continued from time to time to any desired extent until the water passes off almost clear and the solid materials are kept in the grain, and such grain is in a sufficiently dry condition to be either used as food for cattle or to be further treated to dry and bale the same for transportation.

Under all circumstances the materials which are returned by the action of the water, appear to have an affinity for the previously partially dried grains and to adhere to them, and such previously partially dried grains act as a filter and allow the water to run off comparatively free from solid matter while such solid matter remains with the previously partially dried grains, thus reducing the amount of water that has to be evaporated to a minimum previous to the baling and transportation of such materials.

I claim as my invention—

1. The method herein specified of treating brewers' grains and similar materials, consisting in subjecting the mass to a progressive mechanical movement for the expulsion of a portion of the water, causing the water which has been expelled to pass over and run through the partially dried materials by gravity, to filter such water and cause the principal portion of the solid materials to remain with the previously partially dried grains as the water goes through such grains and repeating the said operation for the retention of the solid materials and the separation of the water, substantially as set forth.

2. The combination in an apparatus for treating brewers' grains, of a perforated surface, a conveyer for moving the grains along over such perforated surface as the watery materials drain out, a second perforated surface upon which the partially de-hydrated grains are received, a conveyer to move the grains over such surface and a conduit to deliver the watery materials from the first part of the apparatus over the partially dried grains in the second part of the apparatus for leaving the solid materials behind as the watery matters run through the grain substantially as specified.

Signed by me this 6th day of March, 1893.

JOHN J. HAYES.

Witnesses:
GEO. T. PINCKNEY,
LEMUEL W. SERRELL.